May 11, 1937.　　　A. J. PATCH　　　2,079,868

BOAT AND METHOD OF MANUFACTURE

Filed April 26, 1932　　　2 Sheets-Sheet 1

Inventor
Allen J. Patch
By Lloyd W. Patch
Attorney

May 11, 1937. A. J. PATCH 2,079,868
BOAT AND METHOD OF MANUFACTURE
Filed April 26, 1932 2 Sheets-Sheet 2
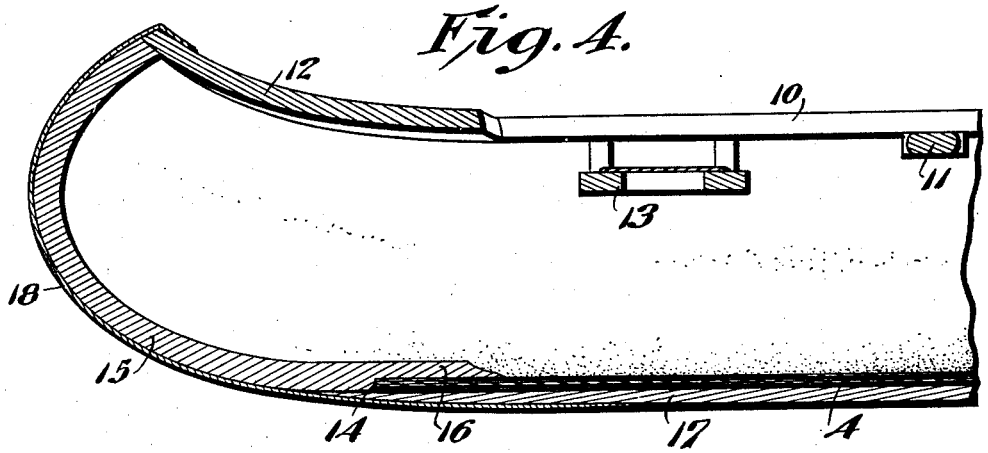
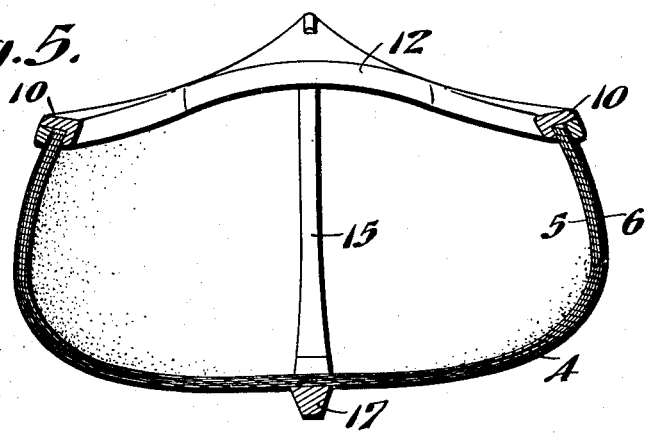
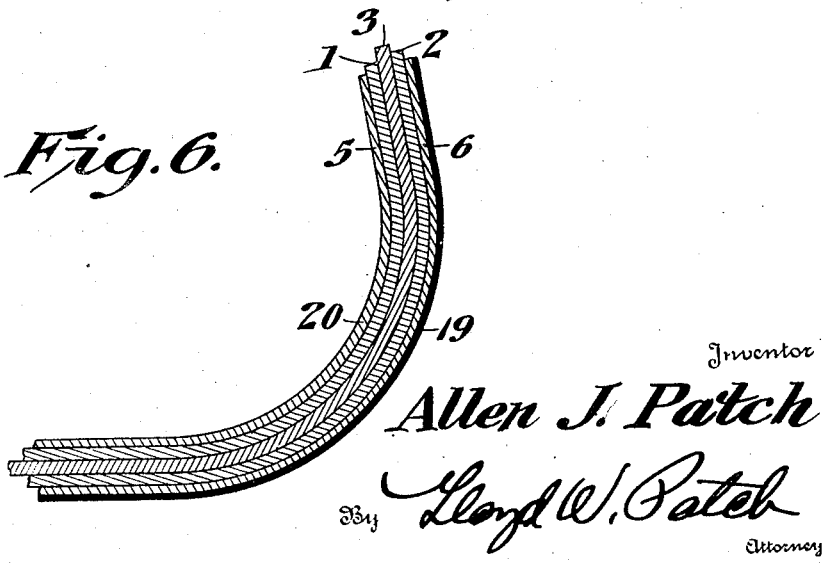
Inventor
Allen J. Patch
By Lloyd W. Patch
Attorney Patented May 11, 1937

2,079,868

UNITED STATES PATENT OFFICE 2,079,868

BOAT AND METHOD OF MANUFACTURE

Allen J. Patch, Ripon, Wis.

Application April 26, 1932, Serial No. 607,617

5 Claims. (Cl. 9—6)

My invention relates to improvements in laminated structural material and the method of making and using the same, and particularly as applied in the construction of canoes and other structures that will be subjected to water or exposed to moisture.

An object of this invention is to provide a laminated structural material possessing the strength of plywood or other similar laminated sheet material, having the layers thereof secured together with cross-grain and which has surface layers of vulcanized fiber or other material without distinctive grain in any direction to thus bind down and securely hold the grain of the plywood layers to prevent an initial splintering or checking or bruising, or breaking of the grain of the plywood layers, which will cause a fracture or separation of said layers.

Another object is to so construct the parts that the laminated material in sheet form, with the several layers thereof securely connected together can be shaped and formed into the body of a canoe or other structure, and where the material is curved the surface layer on the outer side will be stretched or held under tension, whereas the surface layer on the inner side will be pressed to thus bear against the adjacent plywood layer to closely bind and adhere to the same, and to counteract any tendency toward separation of the layers.

Yet another object is to provide a structure made up of laminated material possessing all of the desirable qualities of lightness and strength inherent in plywood having cross-grains, which yet presents a finished surface having a uniform and close-knit structure and appearance without grain, which surface adds to the strength of the plywood and forms a continuous smooth surface for finishing.

With the above and other objects in view which will be apparent to those skilled in the art, my invention includes certain novel features of construction and combinations of parts which will be hereinafter set forth in connection with the drawings and then pointed out in the claims.

In the drawings:

Fig. 4 is a longitudinal sectional view through one end of the canoe structure.

Fig. 5 is a sectional view taken transversely through the body structure.

Fig. 6 is a fragmentary sectional view through a curved portion of the structure.

Where canoes, boats, and other structures are made of plywood, several serious faults have developed. The veneer used in making plywood is necessarily made in strips, is usually not wider than 12" to 14", and consequently it is necessary in securing the several plies of veneer together to form the continuous plywood sheet to use a number of these strips, with adjacent side edges abutting together. Even though great care be exercised in assembling and cementing, or otherwise causing the layers of veneer to adhere together, it is impossible to make these edge joints between the strips perfectly tight. In a structure such as a canoe, in which the outer layers of veneer of the plywood sheet are ordinarily assembled with the grain running transversely, there are some 10 or 12 joints in the outer and inner layers of veneer, and water finds its way through the joints at the edges and in time causes blistering under the veneer, or the sun beating upon the canoe, or other atmospheric changes will cause the veneer to loosen slightly and curl at these points. In either case, water finding its way between the veneer layers of the plywood will cause rotting and general deterioration of the plywood material.

Further, the thin veneer sheets have very little strength cross-ways of the grain and the outer layers of veneer are easily cracked, splintered, checked, or bruised, which will cause breakage and rupturing of the grain or fibers of the wood transversely to thus materially weaken the material and form additional openings through which water will be taken in to cause rotting and deterioration.

Broadly my invention contemplates elimination of these disadvantages by application to the plywood of a surface skin or layer of vulcanized fiber which is equally strong in all directions and which has no grain in any direction, thus binding down the grain of the plywood layers and making possible the formation of a canoe or other structure having a substantially continuous and unbroken outer protective layer.

Figure 1:
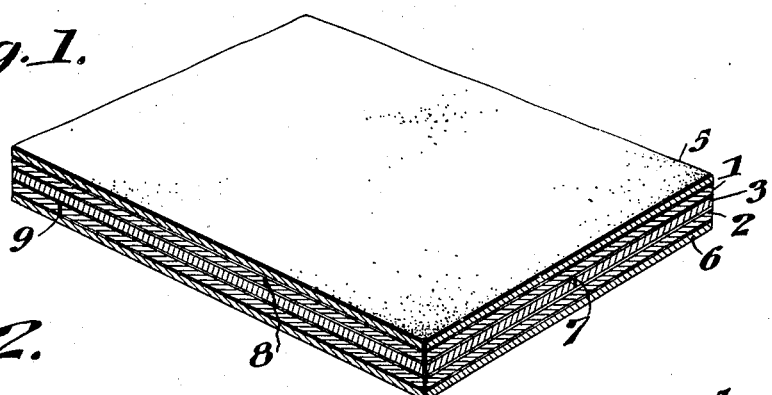
Figure 1 is a perspective view showing a fragment of a panel or sheet of my improved laminated structural material.
Figure 2:
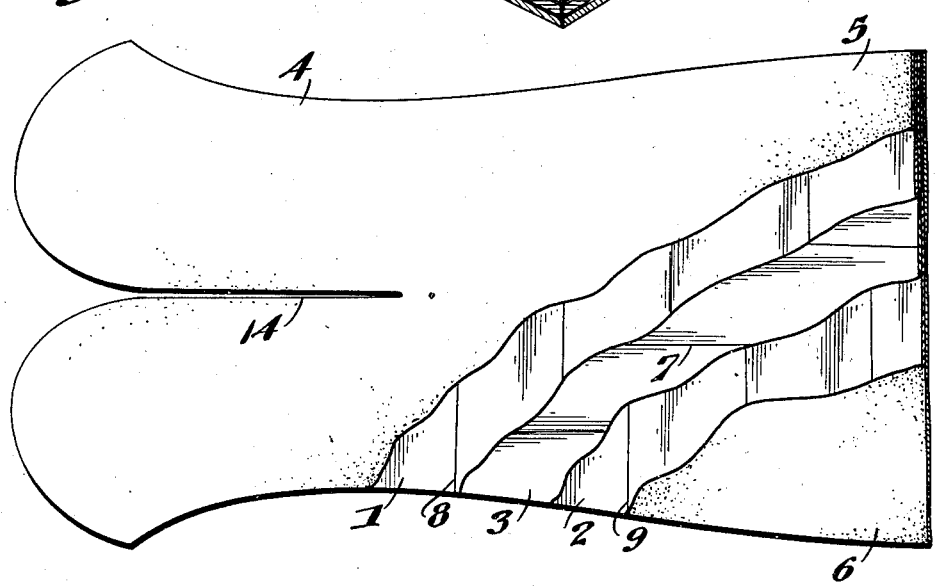
Fig. 2 is a view in plan, and partly broken away illustrating a blank shaped to be formed into a canoe or boat.

As illustrated in Figs. 1 and 2, the plywood portion is made up of three layers of veneer 1, 2 and 3, the outer layers 1 and 2 being perhaps preferably applied upon the middle layer 3 with the grain extending substantially at right angles. Where the material is to be used in the construction of a canoe, boat, or like structure, it is perhaps advantageous that the veneer layer 3 be disposed with the grain extending substantially longitudinally of the sheet from which the blank or shape 4 will be formed, and the layers 1 and 2 will be assembled upon this middle layer or veneer 3 with the grain extending across the grain of the veneer sheet 3 and substantially transversely of the blank 4.

Upon the outer layers 1 and 2 of veneer forming up the plywood sheet or blank, I secure surface layers 5 and 6 of fibrous material having no distinct grain in any direction, such as the ordinary commercial vulcanized paper fiber. The several layers of veneer and the surface layers 5 and 6 of fiber are secured together by the use of any suitable cement or adhesive, of which casein and blood-albumen adhesives are illustrative, and all edge joints 7 of the inner veneer will be covered and sealed by the application of the veneer layers 1 and 2, whereas edge joints 8 and 9 of these outer veneer layers will be covered and sealed against ingress of water and against checking or separating by the fiber layers 5 and 6. As these fiber layers do not possess distinct grain in any direction, they are equally strong against strains exerted from any point and in consequence add greatly to the strength of the plywood structure without materially increasing the weight. This sheet material is made up in flat sheets, the several layers being assembled and held under great pressure to secure a flat even sheet with the various layers or plies adhering to form a substantially continuous structure.

Where the material is used in construction of a canoe, boat or the like, the blank 4 is cut or otherwise shaped, substantially as illustrated in Fig. 2 and the blank is then softened by boiling, steaming, or the like, so that it is sufficiently pliable to be shaped and formed over or within molds to obtain the desired curved body form of the canoe, or other finished article.

Figure 3:
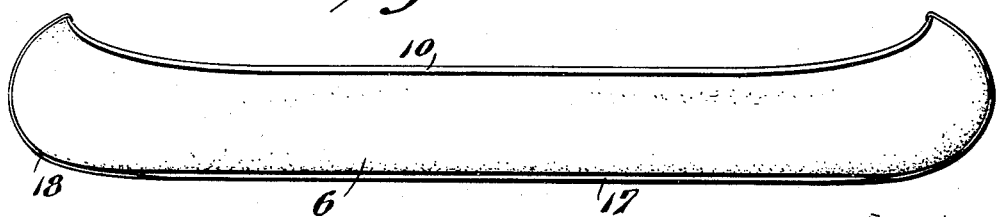
Fig. 3 is a view in side elevation of a canoe constructed in accordance with my invention.

As illustrated in Fig. 4, the laminated material is readily shaped to the desired form for the body of a canoe and gunwales 10 can be fitted on the upper edges of the body portion, these gunwales being braced by the usual thwarts 11 and carrying the usual deck structures 12, seats 13 and other parts as required. Where the material is shaped as a single blank to be conformed to the desired body form of the boat, it is perhaps desirable that the blank be split, as at 14, adjacent the ends, and stem pieces 15 can be secured in place between the divided ends of the blank and carried back as at 16 onto the middle portion to thus permit rigid attachment to the body material. A keel 17 can be fitted in place, and a cut-water strip 18, of any desired form can be used. As shown in Fig. 3, the completed canoe or boat does not present any seams, joints or other marks on the surface, and the boat is presented to readily take any desired surface treatment. This might be accomplished by impregnating or coating the outer and inner layers 5 and 6 with any suitable material.

Fig. 6 illustrates the manner in which this material adapts itself for formation over the tumblehome and other portions of a canoe body or the like, and as here illustrated the material of the outer layer 6 is stretched and held under tension at 17 around the bulge of the curve, whereas the inner layer 5 is slightly compressed and thickened where the material accumulates at 20 on the inner side of the bulge of the curve. It is thought that, in effect, the material of the outer and inner layers flows or stretches and compresses somewhat after the manner shown in Fig. 6, and when this vulcanized fiber material is dried the deformed or conformed shape is held by the inherent rigidity of the vulcanized fiber material. Due to the fact that a flat sheet is conformed to make the desired boat form, the material at 19 will be held under tension whereas the material at 20 will be under compression, and in consequence the plywood veneer layers will be closer adherent and will be protected against being splintered, checked, bruised, broken, fractured, or otherwise injured. At the same time the outer continuous layers of fibrous material will protect the wooden veneer layers against contact with or absorption of moisture, and the continuous unitary structure will guard against breakage or the possibility of rotting or other damages.

While I have herein shown and described only certain specific embodiments of my invention and have set forth only certain possible modifications, it will be appreciated that any changes and variations can be resorted to without departing from the spirit and scope of my invention.

I claim:

1. The method of forming the curved parts of a canoe body comprising a core of wood and outer and inner sheets of fiber which consists in bending the body material under heat and pressure and causing said fiber sheet material to flow at curved surfaces to take a permanent set.

2. A canoe having the body thereof formed of a wood core provided with inner and outer sheet fiber layers conformed to the desired canoe body shape with the fiber thinned on the outer side and thickened on the inner side of curved surfaces.

3. A molded curved body structure such as a boat body made of a flat sheet of laminated ply material comprising, a sheet wood core and vulcanized fiber sheets adhesively secured throughout their surfaces on opposite faces of the wood core forming a covering for the outer and inner sides of the core, all of said laminations being secured together in flat sheet form and being moistened to soften the vulcanized fiber sheets and the flat sheet then being formed to the desired curved body shape to deform the vulcanized fiber sheets to follow the desired curves of the inner and outer surfaces of the body structure and being then dried to set and harden the vulcanized sheet fiber layers to permanently set and hold the desired curved body form.

4. The method of forming a curved walled body structure such as a boat body comprising, a laminated sheet made up of a core of wood and outer and inner covering sheets of vulcanized fiber, which consists in moistening and softening the vulcanized fiber sheets, bending and forming the sheet to the desired curved shape, and drying and hardening the fiber sheets while retaining the formed shape to thus set the sheet so that the outer vulcanized fiber sheet inherently retains the outer curve while the inner vulcanized fiber sheet holds the inner curve and the wood core bridges between and holds the two form retaining sheet in paced relation.

5. A molded curved body structure such as a boat body comprising, a laminated sheet having inner and outer cover plies of vulcanized fiber sheets and a core sheet of wood therebetween connected together adhesively throughout their entire adjacent surfaces, deformed in accordance with the curvature desired for the body structure while wet and then dried to permanently set and hold the curvature.

ALLEN J. PATCH.